(12) United States Patent
Plagemann et al.

(10) Patent No.: US 9,562,301 B2
(45) Date of Patent: Feb. 7, 2017

(54) SELECTIVELY COATED CRP COMPONENTS AND PROCESS FOR THE PRODUCTION THEREOF

(75) Inventors: Peter Plagemann, Bremen (DE); Andreas Brinkmann, Essen (DE); Anja Zockoll, Essen (DE); Armin Fangmeier, Randen (DE); Rouven Kott, Bremen (DE); Simone Schroder, Bremen (DE); Thomas Lemckau, Buxtehude (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 694 days.

(21) Appl. No.: 14/001,046

(22) PCT Filed: Feb. 24, 2012

(86) PCT No.: PCT/EP2012/053196
§ 371 (c)(1),
(2), (4) Date: Oct. 7, 2013

(87) PCT Pub. No.: WO2012/113926
PCT Pub. Date: Aug. 30, 2012

(65) Prior Publication Data
US 2014/0037919 A1    Feb. 6, 2014

(30) Foreign Application Priority Data
Feb. 25, 2011 (DE) .......... 10 2011 004 801

(51) Int. Cl.
*C25D 7/00* (2006.01)
*C09D 5/44* (2006.01)
(Continued)

(52) U.S. Cl.
CPC .......... *C25D 7/00* (2013.01); *B32B 15/14* (2013.01); *C08J 5/04* (2013.01); *C08J 5/042* (2013.01);
(Continued)

(58) Field of Classification Search
None
See application file for complete search history.

(56) References Cited

U.S. PATENT DOCUMENTS 4,272,346 A * 6/1981 Jakubowski .......... C25D 13/12
204/489
4,321,298 A * 3/1982 Shaffer .................. C04B 35/83
156/245

(Continued)

FOREIGN PATENT DOCUMENTS

DE        2821047        11/1979
DE    102007029337        6/2007
(Continued)

OTHER PUBLICATIONS

Danford, Merlin D. et al., "Galvanic Coupling Between D6AC Steel, 6061-T6 Aluminum, Inconel 718, and Graphite-Epoxy Composite Material: Corrosion Occurrence and Prevention," NASA Technical Paper 2236, 1983.
(Continued)

*Primary Examiner* — Robert S Loewe
(74) *Attorney, Agent, or Firm* — Preti Flaherty Beliveau & Pachios LLP

(57) ABSTRACT

A component made of carbon fiber reinforced plastic is described, consisting of or comprising a matrix material (M) and carbon fibers embedded into the matrix material (M), wherein the component has at least one surface portion (A), having one or a plurality of exposed regions of the carbon fibers, characterized in that the exposed regions(s) of the (Continued)

Figure 1:
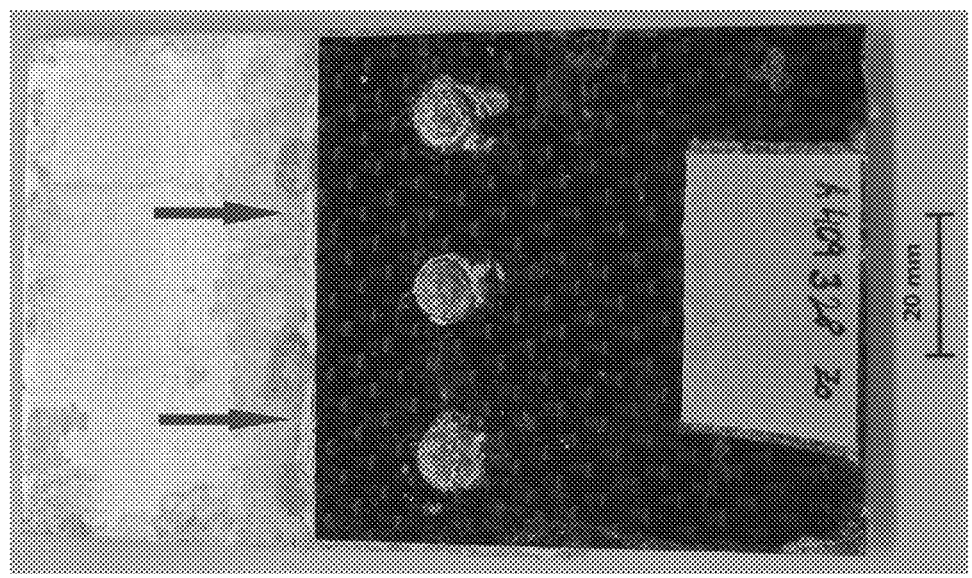

carbon fibers is or are selectively coated with a layer (S). A process for producing such a component and also an assembly comprising such a component and one or a plurality of further components comprising or consisting of a material such as steel, iron, copper, magnesium or aluminum or alloys thereof are also described.

14 Claims, 5 Drawing Sheets

(51) Int. Cl.
  *C25D 13/04*   (2006.01)
  *B32B 15/14*   (2006.01)
  *C25D 5/56*   (2006.01)
  *C25D 13/12*   (2006.01)
  *C08J 5/04*   (2006.01)
  *C25D 5/02*   (2006.01)
  *C25D 9/02*   (2006.01)
  *C25D 13/00*   (2006.01)
  *B29C 65/00*   (2006.01)
  *B29C 41/14*   (2006.01)
  *B29C 41/20*   (2006.01)

(52) U.S. Cl.
  CPC .............. *C09D 5/4476* (2013.01); *C25D 5/02* (2013.01); *C25D 5/56* (2013.01); *C25D 9/02* (2013.01); *C25D 13/00* (2013.01); *C25D 13/04* (2013.01); *C25D 13/12* (2013.01); *B29C 41/14* (2013.01); *B29C 41/20* (2013.01); *B29C 66/7212* (2013.01); *B29C 66/742* (2013.01); *B32B 2255/02* (2013.01); *B32B 2255/205* (2013.01); *B32B 2255/26* (2013.01); *B32B 2262/106* (2013.01); *Y10T 428/24802* (2015.01); *Y10T 428/24917* (2015.01)

(56) References Cited

U.S. PATENT DOCUMENTS

| | | | | |
|---|---|---|---|---|
| 4,397,901 A | * | 8/1983 | Warren | B82Y 30/00 427/228 |
| 4,455,207 A | * | 6/1984 | Sartor | C23C 14/20 204/192.14 |
| 4,476,164 A | * | 10/1984 | Veltri | C04B 41/009 427/249.16 |
| 4,983,463 A | * | 1/1991 | Minford | B29C 70/86 428/113 |
| 5,039,550 A | * | 8/1991 | Malghan | C03C 14/002 427/214 |
| 5,209,819 A | * | 5/1993 | Suzuki | H05K 1/0373 216/23 |
| 5,254,397 A | * | 10/1993 | Kawai | C04B 41/52 428/293.4 |
| 5,302,319 A | * | 4/1994 | Wright | C01B 13/32 106/287.17 |
| 5,419,927 A | * | 5/1995 | Dietrich | B28B 11/04 427/309 |
| 5,468,358 A | * | 11/1995 | Ohkawa | C25D 13/02 204/487 |
| H001682 H | * | 10/1997 | Brown | C04B 41/009 205/509 |
| 5,716,677 A | * | 2/1998 | Mazany | C08G 73/1007 427/377 |
| 2004/0112746 A1 | * | 6/2004 | Tseung | C09K 11/642 204/471 |
| 2007/0203282 A1 | * | 8/2007 | Bradley | C08K 3/04 524/439 |
| 2010/0321890 A1 | | 12/2010 | Streyel et al. | |

FOREIGN PATENT DOCUMENTS

| | | |
|---|---|---|
| DE | 102006046518 | 4/2008 |
| JP | 04074868 | 3/1992 |

OTHER PUBLICATIONS

Lu, F. et al., "Galvanic Corrosion and Protection of GECM/LY12CZ Couples Under Different Atmospheric Exposure Conditions," ACTA Metallurgica Sinica, vol. 16, No. 1, pp. 1-45, Feb. 2003.

Fessmann, J. et al., "Adherent metallization of carbon-fibre-reinforced plastic composites using a combined vacuum/electrochemical deposition process," Elsevier Sequoia, Surface and Coatings Technology, 54/55 (1992) 599-603.

* cited by examiner

CRP and AA 2024 in 3% NaCl

Measurement of contact current

CRP with EDP (according to the invention)

CRP without EDP (not according to the invention)

$I_{contact}/\mu A$

Time / hours

SELECTIVELY COATED CRP COMPONENTS AND PROCESS FOR THE PRODUCTION THEREOF

The present invention relates primarily to a component in carbon fiber reinforced plastic (also referred to in the following as a "CRP component"), consisting of or comprising a matrix material (M) and carbon fibers embedded into the matrix material (M), wherein the component has at least one surface portion (A), having one or a plurality of exposed regions of the carbon fibers, characterized in that the exposed region(s) of the carbon fibers is or are selectively coated with a layer (S), wherein the layer (S) is a layer of dipping paint, an electroplated layer or a layer created by electropolymerisation.

The present invention also relates to a novel process for the production of selectively coated CRP-components, in particular selectively coated CRP-components according to the invention.

According to a further aspect the present invention relates to an assembly consisting of or comprising (A) a component according to the invention and
(B) a component comprising or consisting of a material selected from the group consisting of steel, iron, copper, aluminum, magnesium and alloys thereof,
    wherein the component according to (A) and the component according to (B) (preferably by means of one or a plurality of contact surfaces) are connected to one another.

Further aspects of the present invention, in particular preferred configurations, are indicated in the following description, the exemplary embodiments and the attached claims.

The use of CRP-components, i.e. of components in carbon fiber reinforced plastic, has long been known. Such components comprise as a rule a matrix material, normally plastic, and carbon fibers embedded, i.e. incorporated, into the matrix material. CRP-components are inter alia used as high-strength and high-temperature-resistant composites in aerospace and in the automobile industry. The fibers used for producing carbon fiber reinforced plastics are normally produced from polyacrylmethyl, cellulose acetate or tar-like residues from oil refining. The fibers obtained are then normally stabilized (converted to an infusible form), carbonized with the elimination of volatile products and graphitized. The graphitized fibers normally undergo an (oxidative) surface treatment prior to being used for the production of carbon fiber reinforced plastics, in order to obtain a better adhesion between the carbon fibers and the matrix material. For fiber reinforcement of plastics the carbon fibers are normally used in the form of yarns, bands, fabrics and the like. Furthermore, short carbon fibers are also used as fillers.

As a rule CRP-components have one or a plurality of exposed regions of the carbon fibers, i.e. one or a plurality of surface portions on which regions of the carbon fibers are not covered by matrix material. Such regions result in particular from the cut edges, bore holes or other damage to the composite brought about during the production or processing of CRP-components. The carbon fibers are as a rule fundamentally different in terms of their chemical and, in particular, physical characteristics from the matrix material, however, so that frequently special attention has to be paid to such exposed regions of the carbon fibers during the further processing or use of the CRP-components. For the carbon fibers, due to their carbon-based composition, have a very high redox potential, comparable with precious metals, are particularly conductive and unpolar. This results (at least in some regions) in an often undesired conductivity of the component. Upon contact between such CRP-components and other components, in particular components comprising or consisting of steel, iron or above all metallic lightweight construction materials such as for example aluminum and magnesium or alloys thereof, this often leads to damage by corrosion of individual components or of the entire assembly, if the exposed regions of the carbon fibers have a conductive connection with other components. Thus in particular when joining CRP-components with components comprising or consisting of metallic materials such as steel, aluminum and magnesium or alloys thereof, the high redox potential of carbon can lead to the corrosion behavior of the metallic materials substantially changing and under unfavorable conditions possibly becoming considerably worse. In a contact corrosion circuit forming here the exposed regions of the carbon fibers constitute active regions, through which corrosion of the lightweight construction materials can be caused or intensified.

CRP-components with exposed regions of the carbon fibers also have the disadvantage that for example when joining such a component by adhesive bonding with another component, because of the differing surface energy of these exposed regions compared with the matrix material the adhesive properties of the CRP-component are restricted or impaired due to these exposed regions, so that it may not be possible to create adequate adhesion.

Furthermore such exposed regions of the carbon fibers constitute a weakness in terms of the ageing behavior of CRP-components. For there at the phase boundary between carbon fiber and matrix material electrolytes can reach the interior of the component considerably more quickly thereby leading to a lower overall strength of the component.

In the prior art various processes are described which attempt to counter the causes of contact corrosion or the associated consequences (as described above).

Thus for example it is known to use components in titanium in combination with CRP-components, since when connecting (e.g. by joining) titanium and CRP no corrosion like that described above occurs (see Bennie A. Miller Jr., The galvanic corrosion of graphite epoxy composite materials coupled with alloys, Air Force Institute of Technology Wright-Patterson Air Force Base, Ohio, 1975, and F. Belucci, Galvanic corrosion between non-metallic composites and metals: Effect of metal and of temperature, Corrosion Vol. 47, No. 10). Such an approach has the disadvantage, however, that high material costs are incurred.

A further approach known in the prior art (see Egon Kunze, Korrosion and Korrosionsschutz, Wiley-VCH, 2001) is concerned with achieving the greatest possible gaps between exposed regions of the carbon fibers of CRP-components and any components in metallic materials (as described above). Such gaps are associated, however, with technical and design restrictions. In addition, the gap required can vary according to the ambient conditions, in particular according to the ingress of moisture and the salt concentration. Where titanium is used here in the form of a spacer, high material costs are also incurred.

It is also known in the prior art for the cut edges of CRP-components to undergo after-treatment with resins. Such processes are relatively complicated, however, and do not offer a sufficiently comprehensive guarantee that all electromagnetically active, exposed regions of the carbon fibers are covered. In addition, the resins to some extent have no, or insufficient, adherence to the surface of the CRP-component. Furthermore, the post-treatment of cut edges with resins often has an adverse effect on the accuracy of fit of CRP-components, which should preferably be maintained to allow combining with other components.

Another approach known in the prior art for avoiding (contact) corrosion between a CRP-component and a metallic component (as parts to be joined), consists of coating the metallic part to be joined (comprising or consisting of for example steel, aluminum, copper, magnesium or alloys thereof) completely or at least on the contact surfaces. In the event of damage to or destruction of such a coating, however, in turn rapid and extensive corrosion occurs.

In addition various processes for pretreatment of the CRP-component surface from the area of plastic coatings have already been tested and adapted in order to avoid the abovementioned (contact) corrosion, but also to counter the abovementioned problem of impaired adhesive properties of CRP-components with exposed regions of the carbon fibers. Relevant examples are processes such as $CO_2$ irradiation, plasma pretreatment and flame treatment (see Groteklaes, Brock, Mischke, Lehrbuch der Lacktechnologie, Vincentz Verlag, 2000). The disadvantage of these processes, however, is that they have a destructive effect on the CRP-component, as a result of which even more carbon fibers are exposed. What is more, none of these processes guarantees complete insulation of the exposed fibers. For example, conductive contacts in the glue line can occur during plasma pretreatment and subsequent bonding of the CRP-component to a metallic contact partner as a result of variations in the thickness of the adhesive layer.

The primary object of the present invention was therefore to provide CRP-components whose use allows the abovementioned problems or disadvantages to be avoided. In particular components should be provided which can be durably joined or bonded to materials such as steel, iron, copper or in particular lightweight construction materials such as aluminum and magnesium, without contact corrosion or without an unacceptable level of contact corrosion occurring.

A further object of the present invention was to indicate a process for the production of such components.

Further aspects of the object of the present invention are indicated by the following description and in particular the attached claims.

The primary object of the present invention is achieved by a component in carbon fiber reinforced plastic (CRP-component), consisting of or comprising a matrix material (M) and carbon fibers embedded into the matrix material (M), wherein the component has at least one surface portion (A), having one or a plurality of exposed regions of the carbon fibers, characterized in that the exposed region(s) of the carbon fibers is or are selectively coated with a layer (S), wherein the layer (S) is a layer of dipping paint, an electroplated layer or a layer created by electropolymerisation.

The exposed regions of the carbon fibers of the surface portion (A) to be selectively coated according to the invention result in particular from the cut edges, bore holes or other damage to the composite brought about during the production or processing of CRP-components (as described by way of introduction).

The at least one surface portion (A) represents in the context of this text a surface portion of the CRP-component in which one or a plurality of regions of the carbon fibers (which are in addition embedded into the matrix material (M)) are not covered by matrix material (M). According to the invention these exposed regions of the carbon fibers are selectively coated with a layer (S), wherein the layer (S) does not consist of matrix material (M).

In connection with the present invention the term "selective" is to be understood to mean that a targeted coating on the one surface portion (A) of a component according to the invention (and possibly further surface portions (A)) takes place, wherein substantially all the exposed regions of the carbon fibers are coated with a layer (S), while the other regions of the surface portion (A), i.e. the regions on which on the surface of the component there is matrix material (M), are substantially not coated with the layer (S). Here, however, in this regard a coating of other regions of the surface portion (A), can also take place to a lesser extent, i.e. a coating of matrix material (M) with a layer (S), if the particular process for selective application of the layer (S) to the exposed regions of the carbon fibers (as described in the following) can lead to one or a plurality of coated surface regions of the surface portion (A), which is or are (slightly) bigger than the exposed, carbon fiber region to be selectively coated itself. Furthermore depending on the process selected for selective coating of the exposed regions of the carbon fibers at least to some extent a coating of matrix material (M) in the surface portion (A) can also take place, if there are carbon fibers directly below the local surface. This is the case in particular with the electrochemical coating methods described in the context of the present invention. Such a coating of the matrix material (M) can in particular take place up to a maximum distance between carbon fibers (located below the surface) and the surface of approximately 100 μm, above all up to a maximum distance of approximately 50 μm.

In connection with the present invention, therefore, it is the case that at least one surface portion (A) of a component according to the invention is preferably not completely coated with a layer (S). It is the case at least, however, that a component according to the invention is not completely coated with a layer (S).

A component according to the invention, due to the selective coating of the exposed carbon fiber regions, is advantageously particularly well-suited for use in combination with one or a plurality of further components comprising or consisting of metallic materials such as steel, iron, copper, aluminum and magnesium or alloys thereof. For advantageously, through selective coating of the exposed carbon fiber regions on surface portions, on which the component according to the invention is joined with a further component in metallic material (as described above), the development of a contact corrosion circuit can be prevented or at least delayed. In particular exposed regions of carbon fibers can be prevented from forming active regions, via which contact corrosion of the materials can be caused or intensified. Accordingly a surface portion (A) (as described above) is preferably a surface portion, which is or is intended to be brought into contact with a surface portion of a further component, in particular of a component comprising or consisting of materials as described above.

A selective coating (according to the invention) offers a number of advantages (in particular compared to a complete coating), such as improved material efficiency and a small (er) influence on the accuracy of fit and (other) surface characteristics of the component.

In the context of the present invention the layer (S) is a layer applied by a chemical or electrophoretic process (as described herein).

According to the invention the layer (S) is
a layer of dipping paint,
an electroplated layer or
a layer created by electropolymerisation.

Preference is for a component (as described above), wherein the layer (S) is
a layer of dipping paint or
a layer created by electropolymerisation.

In the context of the present invention a layer of dipping paint is understood to be a layer (S) applied by electrophoretic dip-painting. Details of cataphoretic or anaphoretic dip-painting are provided further on.

In the context of the present invention an electroplated layer is understood to be a layer (S) applied electrochemically by electroplating. The normal processes of electroplating known to a person skilled in the art are used here. Further details of electroplating in connection with the present invention are provided further on.

In the context of the present invention a layer created by electropolymerisation is understood in particular to be a layer applied by potentiostatic, galvanostatic or potentiodynamic electropolymerisation. Details on this are provided further on.

As a result, therefore, a component according to the invention (as described above) is particularly preferred which can be produced by a process comprising the following steps:
(i) providing a component in carbon fiber reinforced plastic, consisting of or comprising a matrix material (M) and carbon fibers embedded into the matrix material (M), wherein the component has at least one surface portion (A), having one or a plurality of exposed regions of the carbon fibers, and
(ii) coating the exposed regions of the carbon fibers with a layer (S) by
    (a) electrophoretic, in particular cataphoretic or anaphoretic, dip-painting, preferably by cataphoretic dip-painting,
    (b) electroplating a metal selected from the group consisting of zinc, cadmium, copper, nickel, chromium, tin, silver and titanium,
    (c) potentiostatic, galvanostatic or potentiodynamic electropolymerisation, preferably potentiostatic electropolymerisation,
so that the exposed regions of carbon fibers of at least one surface portion (A) are selectively coated with a layer (S).

According to the invention it is therefore in general particularly preferable if the exposed region(s) of the carbon fibers of a component according to the invention (as described above) is or are selectively coated with a layer (S) applied by an electrochemical/electrophoretic process.

A preferred aspect of the present invention relates to a component (as described above), wherein the coating of the exposed regions of the carbon fibers with a layer (S) (has taken or) takes place by (a) cataphoretic or anaphoretic dip-painting.

If on the other hand the CRP-component has been joined prior to selective coating with a further component, in particular with a component comprising or consisting of steel, iron, copper or a lightweight construction material such as aluminum or magnesium or alloys thereof, in the context of the present invention anaphoretic dip-painting is to be preferred. Otherwise, i.e. if the CRP-component alone is to be (selectively) coated, in the context of the present invention cataphoretic dip-painting is to be preferred.

The basic physical principle of electrophoretic dip-painting, as also applied in the context of the present invention, is based on the fact that polymer materials are present in colloidal or particle form in an aqueous solution (in the form of a dipping paint) and have a surface charge. This process uses the fact that when a direct voltage with corresponding sign is applied to a conductive material, which is dipped in this dipping paint, the charged polymer materials migrate towards the conductive material. At the same time reactions are occurring on the surface of this conductive material, which lead to a localized change in pH (with cataphoretic dip-painting to higher pH values and with anaphoretic dip-painting to lower values). The change in pH is the trigger for deposition of the polymer materials on the surface (coagulation).

Thus with dip-painting normally an electro-immersion system is used, wherein a direct voltage is applied to a work piece (in this case a component with a surface portion (A) with one or a plurality of exposed regions of the carbon fibers to be selectively coated). The work piece is normally dipped in a bath containing one or a plurality of polymer materials that can be applied electrophoretically to the work piece. During the dip-painting these materials are selectively deposited as a result of the strong localized increase (cataphoretic) or decrease (anaphoretic) in pH in the region of the exposed carbon fibers. Here the deposition parameters are selected in such a way that preferably all the exposed regions of the carbon fibers of surface portion (A) or, if desired, all of the exposed regions of the carbon fibers of the entire component are coated with a layer (S), resulting from the electrophoretic deposition of the abovementioned materials.

In the context of the present invention the dip-painting process is preferably carried out for the time taken until a layer (S) has formed, which has selectively coated (in an isolating manner) exposed regions of the carbon fibers so that no electrical conductivity can be achieved or is present any longer.

According to a further, preferred configuration of the present invention the layer (S) is a layer applied or produced by electropolymerisation.

Here the layer (S) preferably comprises or consists of a polymer, which is formed from a monomeric unit selected from the group consisting of pyrrole, thiophene, aniline, furan, phenol, azulene, carbazol and derivatives thereof, or comprises one such.

Electropolymerisation is a process in which by application of a potential and/or by electrolysis one or a plurality of (organic) monomers are forced into a polymerization reaction to form a polymer. Here the electropolymerisation must be differentiated from common film-forming reactions such as polyaddition, polycondensation or continuous radical polymerization.

In the context of the present invention the electropolymerisation preferably takes place through potentiostatic, galvanostatic or potentiodynamic routes.

Potentiostatic electropolymerisation is particularly preferred. Here monomeric starting molecules (e.g. pyrolle, thiophene, aniline, furan, phenol, azulene or carbazol, preferably pyrolle or thiophene, particularly preferably pyrolle) are oxidized at a working electrode in an electrochemical cell. With this method, the exposed regions of the carbon fibers to be selectively coated are preferably integrated as a working electrode, preferably in a three-electrode structure. The other two electrodes are according to a preferred arrangement a counter electrode, for example in platinum (e.g. in the form of a mesh), and a reference electrode (e.g. a calomel or a silver/silver chloride electrode). By means of a potentiostat the desired differences in potential can be set. The voltage to be applied is preferably above the critical oxidation potential of the monomer or one or a plurality of the monomers used. As a result in the course of the (potentiostatic) electropolymerisation through the electrochemical oxidation of the monomeric unit(s) an electrochemical polymerization on the exposed regions of the carbon fibers, that is to say of the working electrode, is brought about. The mechanism of the electropolymerisation has as yet not been fully explained. However, it is assumed that here initially from (uncharged) monomers (depending on how the process is configured, charged) radicals are formed, which then through dimerization and subsequent deprotonation in turn form neutral conjugated dimers (molecules with two base units). This cycle of radical formation, chain propagation and subsequent deprotonation is repeated cyclically with the monomers present and their polymerization products until the oxidation potential is on the working electrode. Here on the working electrode surface not only can monomeric radicals be formed, but also their dimers, trimers, tetramers and other higher homologues or polymerization products formed on the basis of the monomers used. The radicals formed in this way react (randomly) with one another and lead to high chain propagation on the working electrode surface. In this way a high molecular network is created, which after reaching a critical size deposits onto the working electrode. The critical size, which is defined by the number of individual monomer units in the molecule as a whole, depends here on the temperature, pH and composition of the deposition solution. As a result the growth of a polymer (e.g. polypyrrole) takes place on the exposed regions of the carbon fibers, so that the exposed regions of the carbon fibers are (electromechanically) selectively coated.

In the context of the present invention when performing the (potentiostatic) electropolymerisation it is advantageously possible, to deposit polymers, e.g. polypyrrole, onto the exposed region of the carbon fibers from both non-aqueous and aqueous baths. Depending on the bath, other components can be
- co-solvents, such as alcohols, esters, ketones or ethers, inorganic or organic conducting salts and possibly
- further (additional) components, e.g. additives or catalysts (e.g. NaBr).

Where pyrrole or thiophene are used as monomers in the context of the (preferably potentiostatic) electropolymerisation, preferably a difference in potential in the range 600 mV through 1300 mV (in relation to a calomel reference electrode) is selected. Particular preference when using pyrrole as the monomer is for a difference in potential in the region of approximately 650 mV (in relation to a calomel reference electrode). Particular preference when using thiophene as the monomer is for a difference in potential in the region of approximately 1200 mV (in relation to a calomel reference electrode) to be used.

Particular preference is for a pulsed application of the (oxidation) potential, wherein in each case a pause of approximately 20 seconds is preferably selected between deposits. In this way advantageously particularly homogenous layers (S) are obtained.

The thickness of the layer (S) can be controlled during electropolymerisation basically by the period for which the potential is applied.

In summary, it is particularly preferred if the coating of the exposed regions of the carbon fibers with a layer (S) takes place by potentiostatic electropolymerisation, wherein one or a plurality of monomers selected from the group consisting of pyrrole, thiophene, aniline, furan, phenol, azulene, carbazol and derivatives thereof, and possibly other monomers are used. Particular preference is for the use of pyrrole and/or thiophene as monomers.

Further preference is for a component according to the invention (as described above), wherein the layer (S) has an average thickness in the range 0.1 through 200 μm, preferably 1 through 60 μm.

Where the layer (S) is a layer of dipping paint (as described above), this has an average thickness in the range 1 through 200 μm, preferably 10 through 60 μm.

Where the layer (S) is an electroplated layer (as described above), this preferably has an average thickness in the range 1 through 100 μm, preferably 3 through 50 μm.

Where the layer (S) is a layer created by polymerization (as described above), this preferably has an average thickness in the range 0.1 through 100 μm, preferably 1 through 50 μm.

Particular preference is for a component according to the invention (as described above), wherein the matrix material (M) is selected from the group consisting of duroplastics, in particular epoxides, polyurethanes, polyimides, phenol formaldehyde condensation resins, unsaturated polyesters, vinyl ester resins, and thermoplastics, in particular polyaryletherketones, polyarylethersulfones, polypropylene, polyamides and polyesters.

The component (according to the invention) can be a component of any form (e.g. plates or hollow profiles). Semi-finished products are less preferable according to the invention, however.

A further aspect of the present invention relates to a process for producing a component from carbon fiber reinforced plastic (CRP-component), preferably a component according to the invention as described above, particularly preferably a component according to the invention, which is indicated above as preferred, wherein the process comprises the following steps:
(i) providing a component in carbon fiber reinforced plastic, consisting of or comprising a matrix material (M) and carbon fibers embedded into the matrix material (M), wherein the component has at least one surface portion (A), having one or a plurality of exposed regions of the carbon fibers, and
(ii) coating the exposed regions of the carbon fibers with a layer (S) by
  (a) electrophoretic dip-painting (see above), preferably by cataphoretic dip-painting,
  (b) electroplating of a metal selected from the group consisting of zinc, cadmium, copper, nickel, chromium, tin, silver and titanium, or
  (c) electropolymerisation, preferably potentiostatic, galvanostatic or potentiodynamic electropolymerisation, particularly preferably potentiostatic electropolymerisation,
so that the exposed regions of the carbon fibers of the at least one surface portion (A) are selectively coated with a layer (S).

For the preferred configurations of steps (i) and (ii) that stated above applies by analogy.

Accordingly, according to one configuration of the process according to the invention it is preferred if the coating of the exposed regions of the carbon fibers with a layer (S) takes place (a) by cataphoretic dip-painting (as described above). Here that stated above in connection with the dip-painting applies by analogy.

According to a further configuration of the process according to the invention it is particularly preferred, if the coating of the exposed regions of the carbon fibers with a layer (S) takes place by (c) potentiostatic electropolymerisation, preferably by potentiostatic electropolymerisation using a monomer selected from the group consisting of pyrrole, thiophene, aniline, furan, phenol, azulene, carbazol and derivatives thereof, so that a layer (S) is obtained consisting of or comprising a polymer, which is formed from a monomeric unit selected from the group consisting of pyrrole, thiophene, aniline, furan, phenol, azulene, carbazol and derivatives thereof or comprises one such.

The matrix material (M) is preferably selected from the group consisting of duroplastics, in particular epoxides, polyurethanes, polyimides, phenol formaldehyde condensation resins, unsaturated polyesters, vinyl ester resins and thermoplastics, in particular polyaryletherketones, polyarylethersulfones, polypropylene, polyamides and polyesters.

As described above, a component according to the invention is in particular suitable for combining with one or a plurality of further components comprising or consisting of a material such as for example steel, iron, copper, aluminum or magnesium or alloys thereof.

Accordingly a further aspect of the present invention relates to an assembly consisting of or comprising
(A) a component according to the invention, preferably a component according to the invention which is indicated above as preferred, and
(B) a component comprising or consisting of a material selected from the group consisting of steel, iron, copper, aluminum and magnesium and alloys thereof, preferably comprising or consisting of a lightweight construction material selected from the group consisting of aluminum and magnesium and alloys thereof, wherein the component according to (A) and the component according to (B), preferably by means of one or a plurality of contact surfaces, are (directly) connected to one another (e.g. by joining, in particular by adhesive bonding and/or rivets).

Here the contact surfaces preferably have one or a plurality of surface portions (A), on which the exposed regions of the carbon fibers are selectively coated with a layer (S) (as described above).

Advantageously, by selective coating of the exposed carbon fiber regions, in particular of the exposed carbon fiber regions on the contact surfaces on which the component (A) according to the invention is to be connected to the further component (B) (as described above), the formation of a contact corrosion circuit is prevented or at least delayed. In particular exposed regions of carbon fibers can be prevented from forming active regions, via which contact corrosion of the abovementioned materials of the further component (B) can be caused or intensified.

Components (A) and (B) and any further components of an assembly according to the invention are according to a preferred configuration of the present invention connected together by joining using processes known to a person skilled in the art.

The selective coating of the exposed regions of the carbon fibers of component (A) can take place according to the invention before and/or after connecting the components (A) and (B).

In the following the present invention is explained in more detail using examples.

EXAMPLES

Comparative Example 1

CRP-Component not Coated According to the Invention

A CRP-component not coated according to the invention is brought into conductive contact with a component in lightweight construction material, namely aluminum alloy (Al 99.5), and kept for 200 hours in the salt-spray test.

The result of the salt-spray test is shown in FIG. 1.

After 200 hours in the salt-spray test an intensified or accelerated corrosion of the lightweight construction material can be observed through contact with CRP (see arrows in FIG. 1).

Application Example 2

Selective Coating of Exposed Regions of Carbon Fibers of a CRP-Component with Cataphoretic Dipping Paint A CRP-component with exposed regions of carbon fibers is coated with a cataphoretic dipping paint (CDP—in this case: BASF Cathoguard 310 electrodeposition paint).

BASF Cathoguard 310 electrodeposition paint:

| Ingredient: | Description: | Weight [g]: |
| --- | --- | --- |
| Demineralized water | | 433 |
| SC 18-0110 | Acetic acid, 10% | 4 |
| FT 23-0303 | Binding agent | 451 |
| FT 24-7328 | Pigment paste | 112 |

The following deposition conditions are selected: 250 V, 30° C., 150 s.

The following stoving conditions are selected: 15 Min., 175° C.

The result is a CRP-component (according to the invention), wherein the exposed regions of the carbon fibers are selectively coated with a layer (S). Such a component has a particularly good wettability and because of the selective coating is particularly well-suited to combining (e.g. by joining) with one or a plurality of further components consisting of or comprising lightweight construction materials such as aluminum, magnesium or alloys thereof.

Figure 2A:
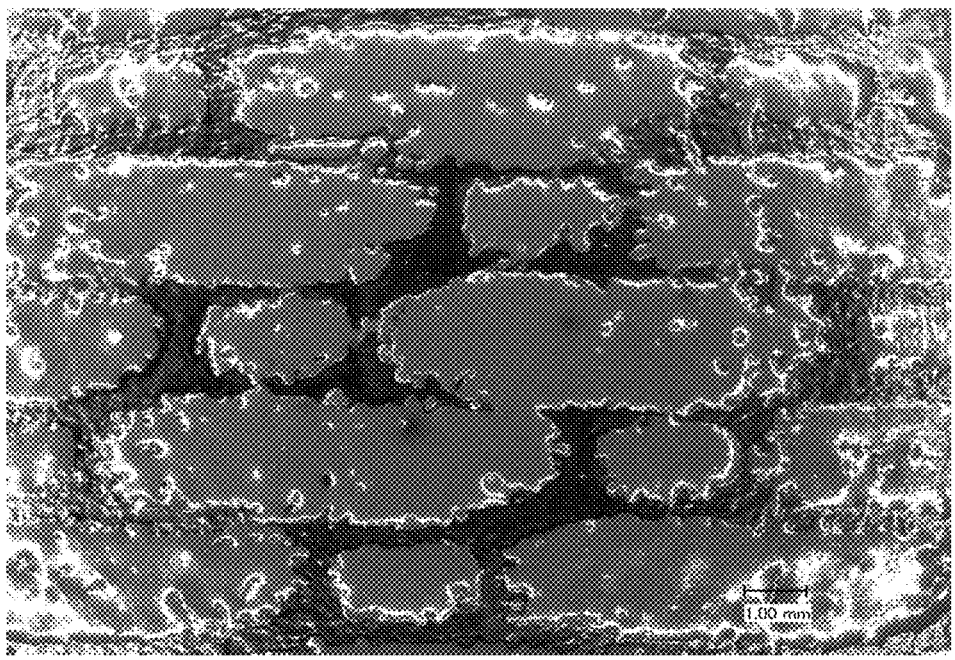

FIG. 2a shows a CRP-component (according to the invention) (duroplastic, prepreg fabric) with CDP layer (top view of surface).

Figure 2B:
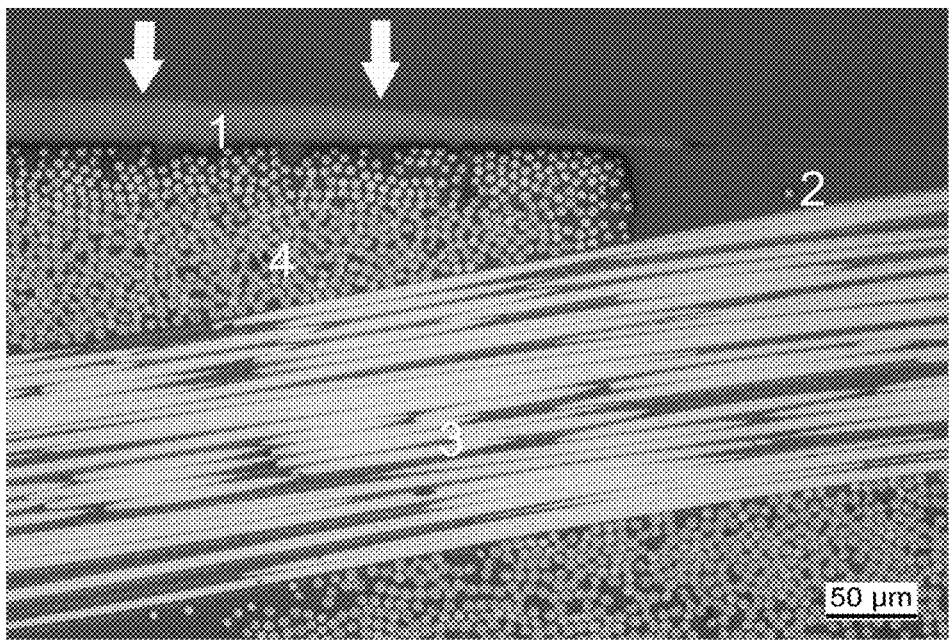

FIG. 2b shows a portion of a cross-section of a CRP-component (according to the invention) (duroplastic, prepreg fabric) with CDP layer. From FIG. 2b (1=CDP, 2=regions without carbon fibers, 3=carbon fibers, 4=carbon fibers) it can be seen that the CDP, as also explained in the context of the above description, to some extent also deposits in regions where the carbon fibers are in regions close to the surface. That is to say that at least to some extent a coating of the matrix materials also takes place (see arrows in FIG. 2b). The CRP-component is not completely coated with CDP however, rather an electrochemical, selective coating of exposed regions of the carbon fibers and to some extent of matrix material in regions, where carbon fibers are located immediately below the surface, takes place (not shown in FIG. 2b).

Figure 3:
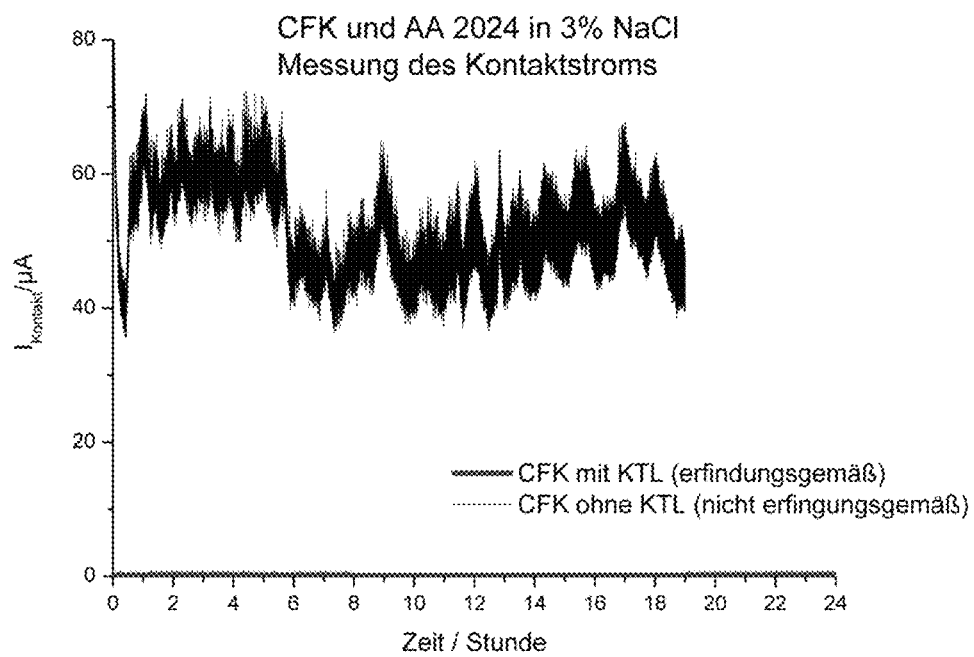

FIG. 3 shows a diagram illustrating the contact corrosion current between (a) a CRP-component (not according to the invention) not coated with CDP and a component in lightweight construction material (in this case AA 2024 clad) or (b) a CRP-component (according to the invention) selectively coated with CDP and a component in lightweight construction material (AA 2024 clad) in 3% NaCl solution. The curve for "CRP with CDP (according to the invention)" (relating to the above alternative (b)) is positioned here (substantially) on the X-axis of the diagram, i.e. no contact corrosion current can be detected.

Application Example 3

Deposition of Copper on Exposed Regions of the Carbon Fibers of a CRP-Component

A CRP-component with exposed regions of the carbon fibers is coated electrochemically as follows by means of electroplating:

As the electrolytes 0.1 mol/l of copper sulfate and 0.5 mol/l sulfuric acid are used.

The following deposition conditions are selected: −300 mV$_{SCE}$, 10 minutes

Figure 4:
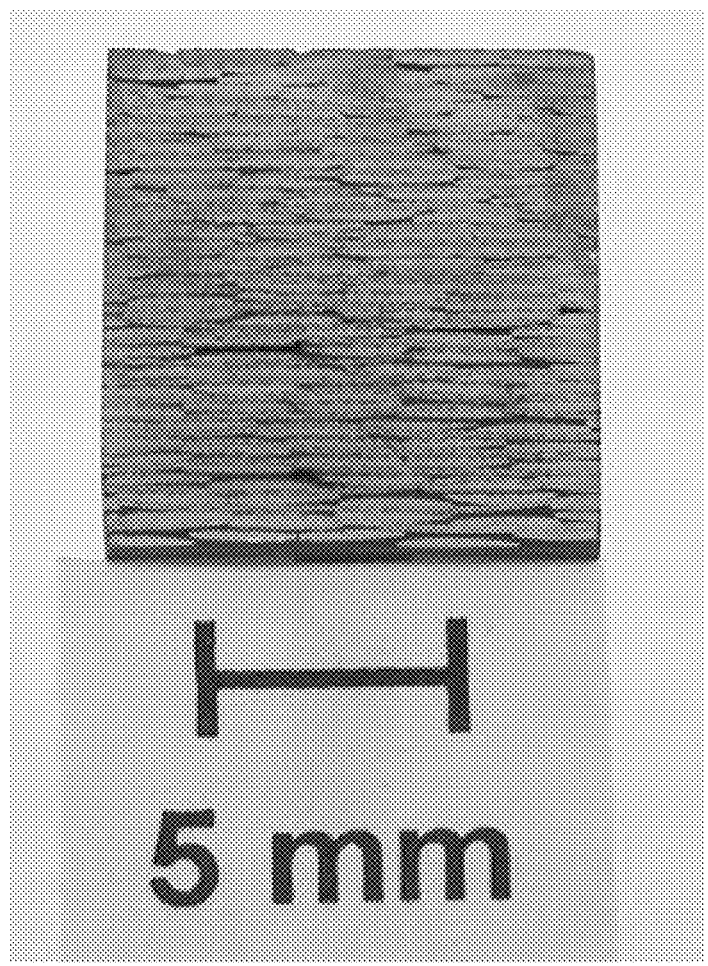

FIG. 4a shows the result of the selective coating, namely the cut edges of a CRP-component (according to the invention) (duroplastic, 0°/90° Atlas fabric), wherein the exposed regions of the carbon fibers are selectively coated with a layer (S), resulting from an electrochemical deposition of copper.

Application Example 4

Selective Coating of Exposed Regions of the Carbon Fibers of a CRP-Component by Electropolymerisation A CRP-component with exposed regions of the carbon fibers is coated electrochemically by electropolymerisation as follows:

Pyrrole is used as the monomer for forming the polymer layer on the exposed regions of the carbon fibers.

The following deposition conditions are selected: 750 mV$_{SCE}$, 45 minutes.

Figure 5A:
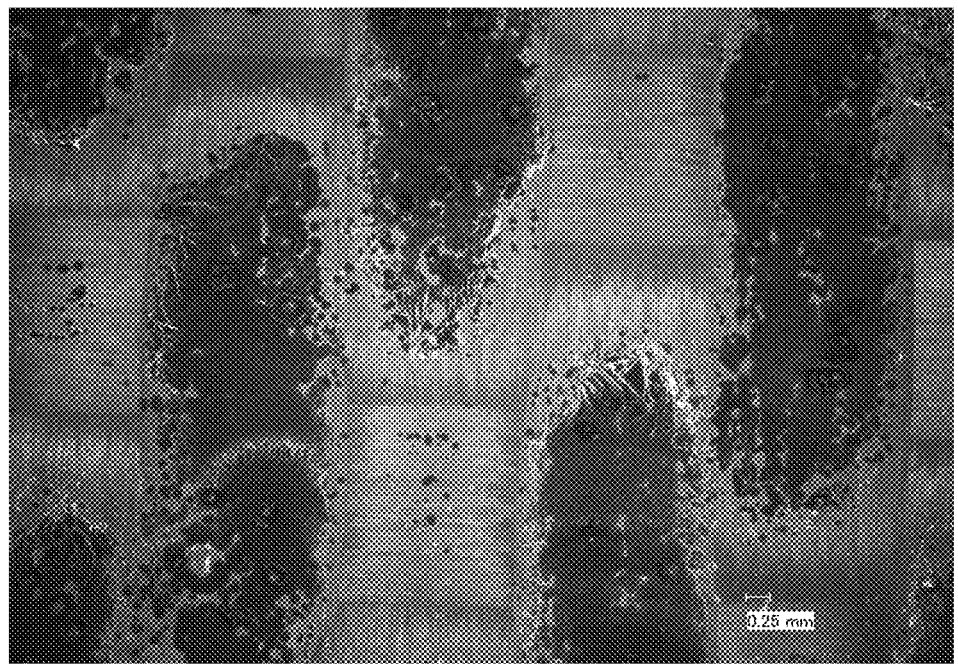
Figure 5B:
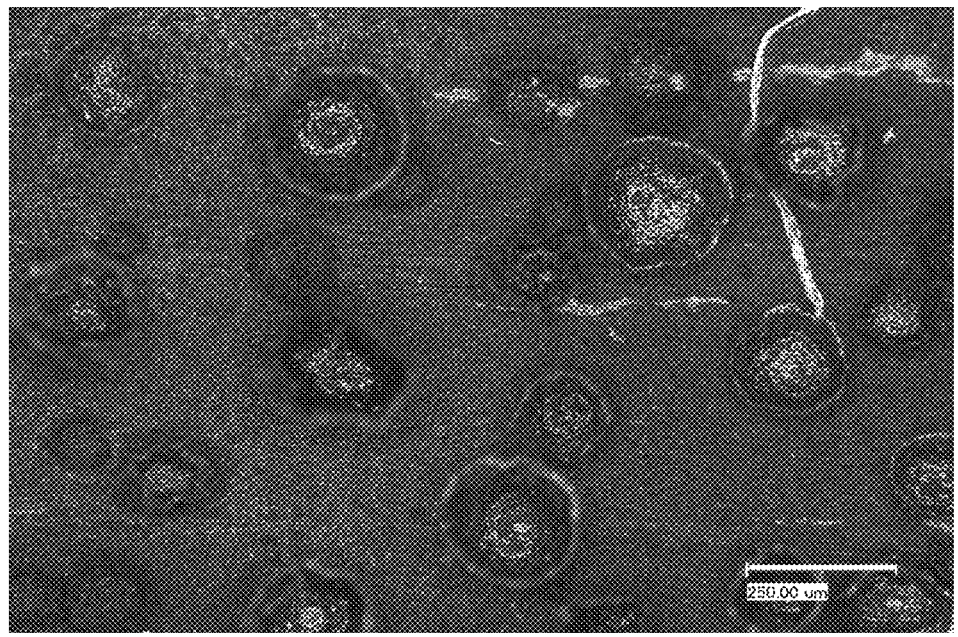

FIGS. 5a and 5b show top views of surface portions (5a surface, 5b cut edge) of CRP-components (according to the invention), wherein exposed regions of the carbon fibers are selectively coated with a layer (S), wherein the layer (S) consists of polypyrrole. The surface portion shown in FIG. 5b is the result of a cut edge.

The invention claimed is:

1. A component in carbon fiber reinforced plastic, consisting of or comprising:
    a matrix material (M) and carbon fibers embedded into the matrix material (M),
    wherein the component has at least one surface portion (A), having one or a plurality of exposed regions of the carbon fibers,
    wherein the exposed region(s) of the carbon fibers of the at least one surface portion A is or are selectively coated with a layer (S), and
    wherein the layer (S) is
        a layer of dipping paint applied by electrophoretic dip-painting
    or
        a layer created by electropolymerization.

2. The component as claimed in claim 1, that can be produced by a process comprising the following steps:
    (i) providing a component in carbon fiber reinforced plastic, consisting of or comprising a matrix material (M) and carbon fibers embedded into the matrix material (M),
    wherein the component has at least one surface portion (A), having one or a plurality of exposed regions of the carbon fibers, and
    (ii) coating the exposed regions of the carbon fibers with a layer (S) by
        (a) electrophoretic dip-painting, preferably by cataphoretic dip-painting, or
        (b) electropolymerization, preferably potentiostatic, galvanostatic or potentiodynamic electropolymerization, preferably potentiostatic electropolymerization,
    wherein the exposed regions of the carbon fibers of the at least one surface portion (A) are selectively coated with a layer (S).

3. The component as claimed in claim 2, wherein the coating of the exposed regions of the carbon fibers with a layer (S) takes place by (a) electrophoretic dip-painting.

4. The component as claimed in claim 1, wherein the layer (S) is a layer produced by electropolymerization and consists of or comprises a polymer, which is formed from a monomeric unit selected from the group consisting of pyrrole, thiophene, aniline, furan, phenol, azulene, carbazole and derivatives thereof or comprises one such.

5. The component as claimed in claim 1, wherein the layer (S) has an average thickness in the range 0.1 through 200 μm.

6. The component as claimed in claim 5, wherein the layer (S) is
    a layer of dipping paint and has an average thickness in the range 1 through 200 μm, preferably in the range 10 through 60 μm, or
    a layer created by electropolymerization and has an average thickness in the range 0.1 through 100 μm, preferably in the range 1 through 50 μm.

7. The component as claimed in claim 1, wherein the matrix material (M) is selected from the group consisting of duroplastics, in particular epoxides, polyurethanes, polyimides, phenol formaldehyde condensation resins, unsaturated polyesters, vinyl ester resins and thermoplastics, in particular polyaryletherketones, polyarylethersulfones, polypropylene, polyamides and polyesters.

8. An assembly consisting of or comprising
    (A) a component as claimed in claim 1 and
    (B) a component comprising or consisting of a material selected from the group consisting of steel, iron, copper, aluminum, magnesium and alloys thereof,
    wherein the component according to (A) and the component according to (B), are connected to one another preferably by means of one or a plurality of contact surfaces.

9. A process for producing a component in carbon fiber reinforced plastic, comprising the steps:
    (i) providing a component in carbon fiber reinforced plastic, consisting of or comprising a matrix material (M) and carbon fibers embedded into the matrix material (M), wherein the component has at least one surface portion (A), having one or a plurality of exposed regions of the carbon fibers, and
    (ii) selectively coating the exposed regions of the carbon fibers of the at least one surface portion (A) with a layer (S) by
        (a) electrophoretic dip-painting, or
        (b) potentiostatic, galvanostatic or potentiodynamic electropolymerization, and wherein the exposed regions of the carbon fibers of the at least one surface portion (A) are selectively coated with a layer (S).

10. The process as claimed in claim 9, wherein the coating of the exposed regions of the carbon fibers with a layer (S) takes place by (a) electrophoretic dip-painting including cataphoretic dip-painting.

11. The process as claimed in claim 9,
wherein the coating of the exposed regions of the carbon fibers with a layer (S) takes place by (b) potentiostatic electropolymerization using one or a plurality of monomers selected from the group consisting of pyrrole, thiophene, aniline, furan, phenol, azulene, carbazole and derivatives thereof, and
wherein a layer (S) is obtained, consisting of or comprising a polymer, which is formed from a monomeric unit selected from the group consisting of pyrrole, thiophene, aniline, furan, phenol, azulene, carbazol and derivatives thereof or comprises one such.

12. The process as claimed in claim 9, wherein the matrix material (M) is selected from the group consisting of duroplastics, in particular epoxides, polyurethanes, polyimides, phenol formaldehyde condensation resins, unsaturated polyesters, vinyl ester resins and thermoplastics, in particular polyaryletherketones, polyarylethersulfones, polypropylene, polyamides and polyester.

13. A component in carbon fiber reinforced plastic, consisting of or comprising:
   a matrix material (M) and carbon fibers embedded into the matrix material (M), wherein the component has at least one surface portion (A), having one or a plurality of exposed regions of the carbon fibers,
   wherein the exposed region(s) of the carbon fibers is or are selectively coated with a layer (S),
   wherein the layer (S) is
      a layer of dipping paint applied by electrophoretic dip-painting
      or
      a layer created by electropolymerization, and
   wherein the layer (S) is a layer produced by electropolymerization and consists of or comprises a polymer, which is formed from a monomeric unit selected from the group consisting of pyrrole, thiophene, aniline, furan, phenol, azulene, carbazole and derivatives thereof or comprises one such.

14. A process for producing a component in carbon fiber reinforced plastic, comprising the steps:
   (i) providing a component in carbon fiber reinforced plastic, consisting of or comprising a matrix material (M) and carbon fibers embedded into the matrix material (M), wherein the component has at least one surface portion (A), having one or a plurality of exposed regions of the carbon fibers, and
   (ii) coating the exposed regions of the carbon fibers with a layer (S) by
      (a) electrophoretic dip-painting, or
      (b) potentiostatic, galvanostatic or potentiodynamic electropolymerization,
   wherein the exposed regions of the carbon fibers of the at least one surface portion (A) are selectively coated with a layer (S),
   wherein the coating of the exposed regions of the carbon fibers with a layer (S) takes place by (b) potentiostatic electropolymerization using one or a plurality of monomers selected from the group consisting of pyrrole, thiophene, aniline, furan, phenol, azulene, carbazole and derivatives thereof, and
   wherein a layer (S) is obtained, consisting of or comprising a polymer, which is formed from a monomeric unit selected from the group consisting of pyrrole, thiophene, aniline, furan, phenol, azulene, carbazole and derivatives thereof or comprises one such.

* * * * *